(12) United States Patent
Jenkins et al.

(10) Patent No.: US 10,966,290 B2
(45) Date of Patent: Mar. 30, 2021

(54) LOW SMOKE, ZERO HALOGEN SELF-REGULATING HEATING CABLE

(71) Applicant: Pentair Flow Services AG, Schaffhausen (CH)

(72) Inventors: Sirarpi Bicakci Jenkins, Menlo Park, CA (US); Jonathan Jones, Halle-Booienhoven (BE)

(73) Assignee: nVent Services GmbH, Schaffhausen (CH)

( * ) Notice: Subject to any disclaimer, the term of this patent is extended or adjusted under 35 U.S.C. 154(b) by 394 days.

(21) Appl. No.: 15/885,270

(22) Filed: Jan. 31, 2018

(65) Prior Publication Data

US 2018/0220495 A1    Aug. 2, 2018

Related U.S. Application Data

(60) Provisional application No. 62/453,259, filed on Feb. 1, 2017.

(51) Int. Cl.
| | | |
|---|---|---|
| *H05B 3/56* | (2006.01) | |
| *H01B 7/02* | (2006.01) | |
| *H01B 7/295* | (2006.01) | |
| *H01B 1/02* | (2006.01) | |
| *H05B 1/02* | (2006.01) | |
| *H05B 3/14* | (2006.01) | |
| *H05B 3/04* | (2006.01) | |
| *H01B 7/28* | (2006.01) | |
| *H01B 3/44* | (2006.01) | |

(52) U.S. Cl.
CPC ............. *H05B 3/565* (2013.01); *H01B 1/02* (2013.01); *H01B 7/0225* (2013.01); *H01B 7/28* (2013.01); *H01B 7/295* (2013.01); *H05B 1/0291* (2013.01); *H05B 3/04* (2013.01); *H05B 3/146* (2013.01); *H01B 3/441* (2013.01); *H05B 2203/011* (2013.01); *H05B 2203/02* (2013.01); *Y02A 30/14* (2018.01)

(58) Field of Classification Search
CPC ....................................................... H05B 3/565
USPC ........................................... 219/49, 520–553
See application file for complete search history.

(56) References Cited

U.S. PATENT DOCUMENTS

| | | |
|---|---|---|
| 4,322,575 A | 3/1982 | Skipper |
| 4,600,806 A | 7/1986 | Beretta |
| 4,671,896 A | 6/1987 | Hasegawa et al. |

(Continued)

FOREIGN PATENT DOCUMENTS

| | | |
|---|---|---|
| CN | 201369842 Y | 12/2009 |
| CN | 201499333 U | 6/2010 |

(Continued)

OTHER PUBLICATIONS

Raychem XP-002781708 BTV self-regulating heating cables, technical data, dated Jan. 2, Tyco Thermal Controls, 2 pages.

*Primary Examiner* — Lori L Baker
(74) *Attorney, Agent, or Firm* — Quarles & Brady LLP (57) ABSTRACT

A low smoke, zero halogen self-regulating heating cable includes a semi-conductive heating core and two conductive wires embedded within and separated by the semi-conductive heating core. The cable also includes a primary jacket surrounding the semi-conductive core, a braid surrounding the primary jacket, and a final jacket surrounding the braid. At least one of the primary jacket and the final jacket includes a low smoke, zero halogen material.

20 Claims, 6 Drawing Sheets

(56) References Cited

U.S. PATENT DOCUMENTS

| | | |
|---|---|---|
| 4,794,132 A | 12/1988 | Djiauw et al. |
| 5,451,747 A * | 9/1995 | Sullivan .................. A61F 7/007 219/505 |
| 5,691,689 A | 11/1997 | Smith et al. |
| 5,912,436 A | 6/1999 | Sanchez et al. |
| 6,737,611 B2 | 5/2004 | Ek et al. |
| 8,097,809 B2 | 1/2012 | Galletti et al. |
| 8,703,288 B2 | 4/2014 | Clancy |
| 8,781,278 B2 | 7/2014 | Karayianni |
| 9,115,273 B2 | 8/2015 | Perez et al. |
| 9,378,868 B2 | 6/2016 | Flenniken et al. |
| 9,472,317 B2 | 10/2016 | Mitsunaga et al. |
| 2004/0060926 A1 | 4/2004 | Weiss |
| 2007/0149680 A1 | 6/2007 | Kim et al. |
| 2012/0225291 A1 | 9/2012 | Karayianni |
| 2015/0257205 A1 | 9/2015 | Hase et al. |

FOREIGN PATENT DOCUMENTS

| | | |
|---|---|---|
| CN | 201754630 U | 3/2011 |
| CN | 201774688 U | 3/2011 |
| CN | 201859243 U | 6/2011 |
| CN | 102548069 U | 7/2012 |
| CN | 202422798 U | 9/2012 |
| CN | 202488787 U | 10/2012 |
| CN | 202617390 U | 12/2012 |
| CN | 103227014 A | 7/2013 |
| CN | 103260275 A | 8/2013 |
| CN | 203181256 U | 9/2013 |
| CN | 203301775 U | 11/2013 |
| CN | 203301776 U | 11/2013 |
| CN | 102731894 B | 4/2014 |
| CN | 203661312 U | 6/2014 |
| CN | 203801089 U | 8/2014 |
| CN | 204117644 U | 1/2015 |
| CN | 104394610 U | 3/2015 |
| CN | 204305377 U | 4/2015 |
| CN | 104761809 A | 7/2015 |
| CN | 204482059 U | 7/2015 |
| CN | 205050589 U | 2/2016 |
| CN | 105491693 U | 4/2016 |
| CN | 105924732 U | 9/2016 |
| CN | 205610955 U | 9/2016 |
| CN | 205648036 U | 10/2016 |
| EP | 0880302 A2 | 11/1998 |
| EP | 0930804 A2 | 7/1999 |
| WO | 0133908 A1 | 5/2011 |
| WO | 2015034919 A1 | 3/2015 |

* cited by examiner

LOW SMOKE, ZERO HALOGEN SELF-REGULATING HEATING CABLE

CROSS-REFERENCE TO RELATED APPLICATIONS

This application is a nonprovisional claiming the benefit of U.S. Prov. Pat. App. Ser. No. 62/453,259, filed under the same title on Feb. 1, 2017, and incorporated fully herein by reference.

BACKGROUND OF THE INVENTION

Self-regulating heating cables generally include two conductor wires embedded in a heating core made of a semiconductive polymer having a resistivity with a positive temperature coefficient (i.e., a "PTC material"). The core creates electrical paths between the conductor wires and heat is generated in the PTC material as electric current passes through these electrical paths between the conductor wires. However, the number of electrical paths between the wires changes in response to temperature fluctuations. In particular, as the ambient temperature drops, the core contracts microscopically. This contraction decreases the core's electrical resistance and creates numerous electrical paths between the wires. Current then flows across these paths to warm the core. Conversely, as the ambient temperature rises, the core expands microscopically, increasing electrical resistance between the wires so that fewer electrical paths exist and less heat is produced.

The heating core is surrounded by multiple layers, including electrical and thermal insulation layers, ground plane layers, mechanical and chemical barriers, etc. Many self-regulating heating cables use, within various layers, materials that contain a halogen in the formulation as a flame retardant. Despite their flame-retardant characteristics, when such halogen-containing products ignite (such as during a fire), they release toxic and corrosive gasses and contribute to high smoke generation. A low-smoke, zero-halogen self-regulating heating cable that conforms to existing safety standards and has desirable manufacturing and operational characteristics is needed.

SUMMARY OF THE INVENTION

The foregoing needs are met by the methods, apparatus, and/or systems for providing low smoke, zero halogen self-regulating heating cables.

In one embodiment of the disclosure, a low smoke, zero halogen self-regulating heating cable is provided. The cable includes a semi-conductive heating core and two conductive wires embedded within and separated by the semi-conductive heating core. The cable also includes a primary jacket surrounding the semi-conductive core, a braid surrounding the primary jacket, and a final jacket surrounding the braid. At least one of the primary jacket and the final jacket includes a low smoke, zero halogen material.

According to another embodiment of the disclosure, a self-regulating heating cable is provided. The cable includes a spacer, two conductive wires separated by the spacer, and a self-regulating fiber heating element wrapped around the two conductive wires and the spacer. The cable also includes a primary jacket surrounding the self-regulating fiber heating element, a braid surrounding the primary jacket, and a final jacket surrounding the braid. At least one of the primary jacket and the final jacket includes a low smoke, zero halogen material.

These and other aspects of the disclosure will become apparent from the following description. In the description, reference is made to the accompanying drawings which form a part hereof, and in which there is shown embodiments of the invention. Such embodiments do not necessarily represent the full scope of the invention and reference is made therefore, to the claims herein for interpreting the scope of the invention.

DETAILED DESCRIPTION OF PREFERRED EMBODIMENTS

Before example embodiments of an apparatus in accordance with the disclosure are described in further detail, it is to be understood that the disclosure is not limited to the particular aspects described. It is also to be understood that the terminology used herein is for the purpose of describing particular aspects only, and is not intended to be limiting. The scope of an invention described in this disclosure will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, this disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Figure 1:
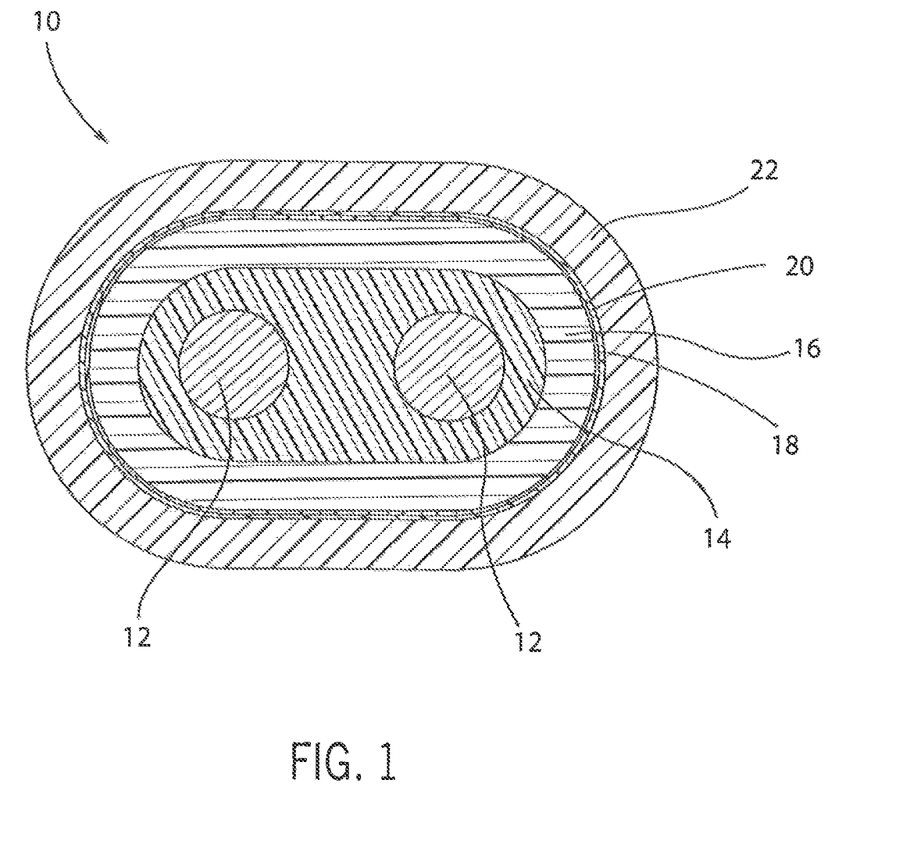
FIG. 1 is a cross-sectional view of a self-regulating heating cable.

FIG. 1 illustrates a self-regulating heating cable 10. As shown in FIG. 1, the cable 10 includes parallel conductor wires 12, a core 14, a primary jacket 16, an optional barrier layer 18, a braid 20, and a final jacket 22. The conductor wires 12 can be made of nickel-coated copper and are surrounded by the core 14, which can be made of a semiconductive polymer material. More specifically, the core 14 can be made of PTC material comprising one or more polymers mixed with conductive carbon black or another conductive filler. This blend of materials can create electrical paths for conducting current between the parallel conductor wires 12 along the length of the cable 10, wherein the number of electrical paths can change in response to ambient temperature fluctuations. In particular, as the ambient temperature drops, the core 14 contracts microscopically. This contraction decreases the core's electrical resistance and creates numerous electrical paths between the wires 12. Current can then flow across these paths between the wires 12 to warm the core 14. Conversely, as the ambient temperature rises, the core 14 expands microscopically, increasing electrical resistance between the wires 12 so that fewer electrical paths exist and less heat is produced.

Referring back to FIG. 1, the core 14 can be coated by the primary jacket 16, which can be an electrically insulating polymer compound. In one embodiment, the primary jacket 16 can have a nominal thickness of about 0.033 inches. However, other thicknesses may be contemplated in other embodiments. On top of the primary jacket 16, the optional barrier layer 18 can act as a barrier for the interior components (e.g., protecting them from water and/or chemicals). The barrier layer 18 can be a metallic foil, such as aluminum foil. The braid 20 (e.g., a tinned-copper or other metallic braid) then surrounds the aluminum foil 18 or the primary jacket 16 and acts as a ground path. On top of the braid 20, the final jacket 22 acts as a mechanical protection layer, and can have a nominal thickness of about 0.021 inches in some embodiments. However, other thicknesses may be contemplated in other embodiments.

In some embodiments, the core 14, the primary jacket 16, and/or the final jacket 22 can be cross-linked. Generally, cross-linking can increase performance, strength, stability, and/or longevity of the cable 24, 26. For example, cross-linking the core 14 can prevent a negative temperature coefficient (NTC) effect at temperatures above the melt temperature of the core 14. Cross-linking the primary jacket 16 and/or the final jacket 22 can increase performance such as thermal, chemical, and abrasion resistance as well as other mechanical properties and increase the softening temperature of the material. In some applications with higher temperature ratings, cross-linking the final jacket 22 can help the cable 24, 26 meet the higher temperature rating. Cross-linking can be achieved in some embodiments by electron beam (e-beam) irradiation, peroxide cross-linking, silane cross-linking, or other methods, and can be performed during or after extrusion.

Regarding the primary jacket 16 and the final jacket 22, a wide range of materials have been used in existing heating cables similar to the heating cable 10. When flammability resistance is required, such existing cables use materials, such as polyolefin with a flame retardant or fluoropolymer, that contain a halogen in the formulation and/or cannot be considered low smoke. In contrast, embodiments in accordance with this disclosure provide a low smoke, zero halogen (LSZH) self-regulating heating cable 10. More specifically, the presently described heating cable 10 has a primary jacket 16 and a final jacket 22 that are made to conform to the International Electrotechnical Commission (IEC) 60754-1 standard, which specifies a procedure for determining the amount of halogen acid gas evolved during material combustion, and the IEC 61034 standard for "low" smoke emission, or similar standards. In another embodiment shown in FIG. 2 and described further below, the cable 24 includes parallel conductor wires 28, a core 30, a primary jacket 32, a braid 34, and a final jacket 36. As shown in FIG. 3, the cable 26 includes the same components 28-36 plus an optional barrier layer 38 (such as metallic foil or aluminum foil) between the primary jacket 32 and the braid 34. In some embodiments, the cables 10, 24, 26 can be rated for power outputs including, but not limited to, 10 Watts per meter (W/m), 15 W/m, 26 W/m, and 31 W/m (measured at 5 deg C.).

Figure 2:
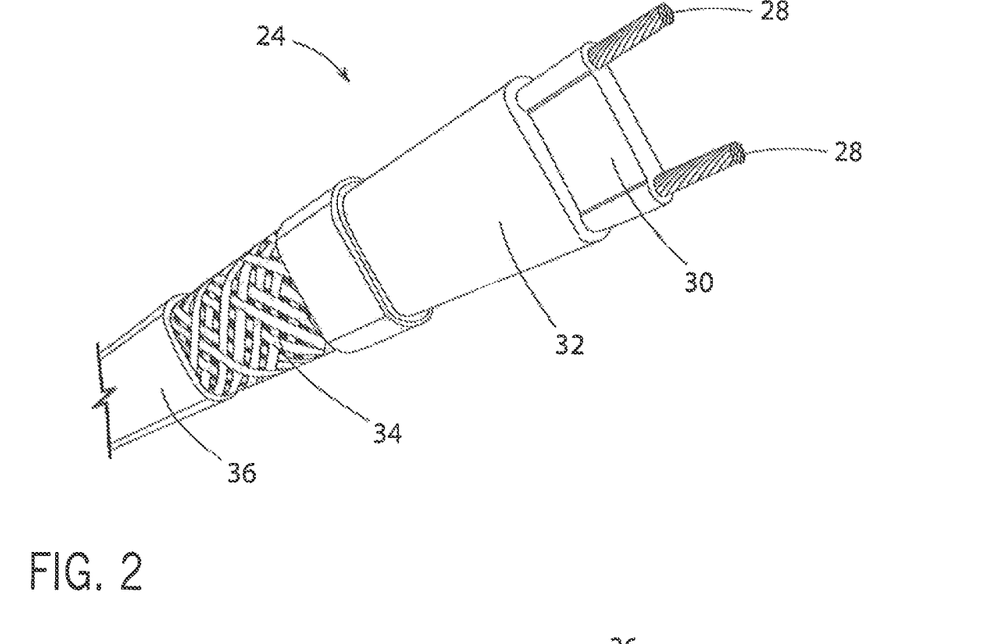
FIG. 2 is a perspective cutaway view of a low smoke, zero halogen (LSZH) self-regulating heating cable according to one embodiment of the invention.
Figure 3:
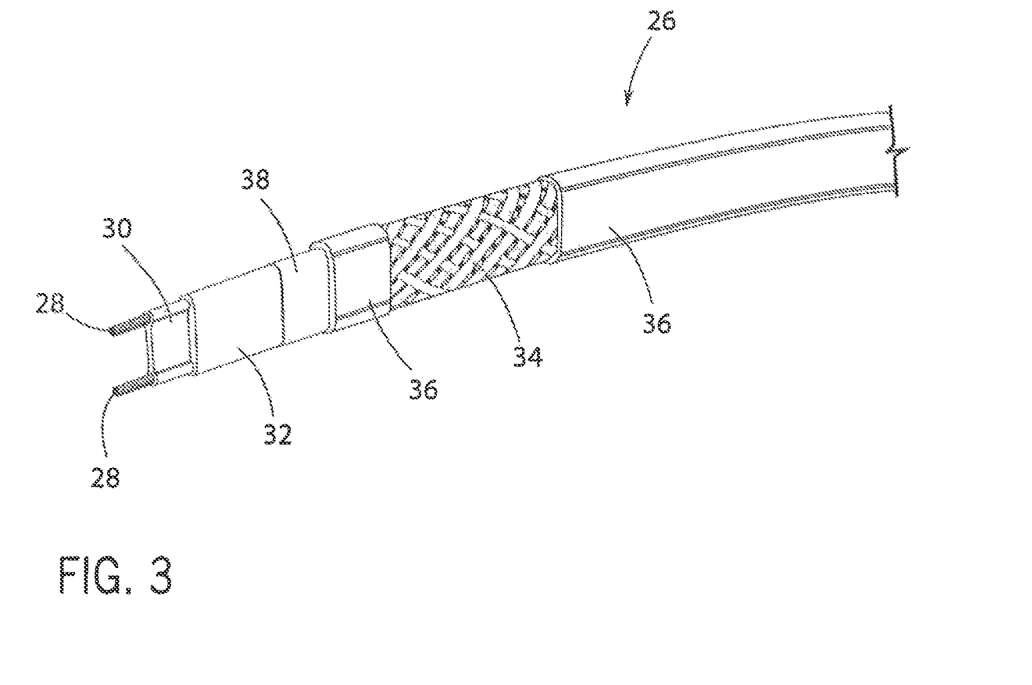
FIG. 3 is a perspective cutaway view of an LSZH self-regulating heating cable according to another embodiment of the invention.

Referring to FIGS. 2 and 3, the conductor wires 28, the core 30, the foil 38, and the braid 34 may be similar in size and composition to those components of the cable 10 of FIG. 1. Additionally, the primary jacket 32 and/or the final jacket 36 of the cables 24, 26 are made of or include an LSZH compound. As a result, the cables 24, 26 contain no halogen (i.e., in any components) and may be considered low smoke (e.g., burns cleanly with less smoke generation), as further described below. The materials of the core 30, primary jacket 32, and/or final jacket 36 may be cross-linked as described above. However, while cross-linking provides the above benefits, such as improved resistance to heat deformation, abrasion, and chemicals, it is an additional step in the manufacturing process and has attendant material, equipment, labor, and quality assurance costs. Further, experimentation has shown that cross-linking the material does not improve the LSZH properties of the heating cable 24. Therefore, one or more of the core 30, primary jacket 32, and final jacket 36 may not be cross-linked to maintain a relatively low manufacturing cost. For example, the primary jacket 32 may be cross-linked in order to tolerate higher temperatures due to the proximity to the core 30; the final jacket 36 may not be cross-linked because it is not subjected to such high temperatures. In some embodiments, the core 30 may also be a zero-halogen material.

Generally, an LSZH compound may comprise polyolefins flame retarded with inorganic hydrated mineral fillers, such as aluminum trihydrate and magnesium hydroxide. For example, in one embodiment, the LSZH compound is an ECCOH™ engineered polymer compound manufactured by PolyOne Corporation. However, other LSZH compounds may be used in other embodiments. For example, any of the layers/jackets that are not cross-linked may include thermoplastic elastomers (e.g., composed of EPDM and polypropylene) flame-retarded with one or more organo-phosphorus-based flame retardants, such as poly-2,4-piperazinyl-6- morpholinyl-1,3,5-triazine and/or ammonium polyphosphate. Furthermore, to be considered LSZH according to embodiments of the invention, the compound contains no halogen per the IEC 60754-1 standard and is deemed to be low smoke when tested under the IEC 61034 standard.

Figure 4:
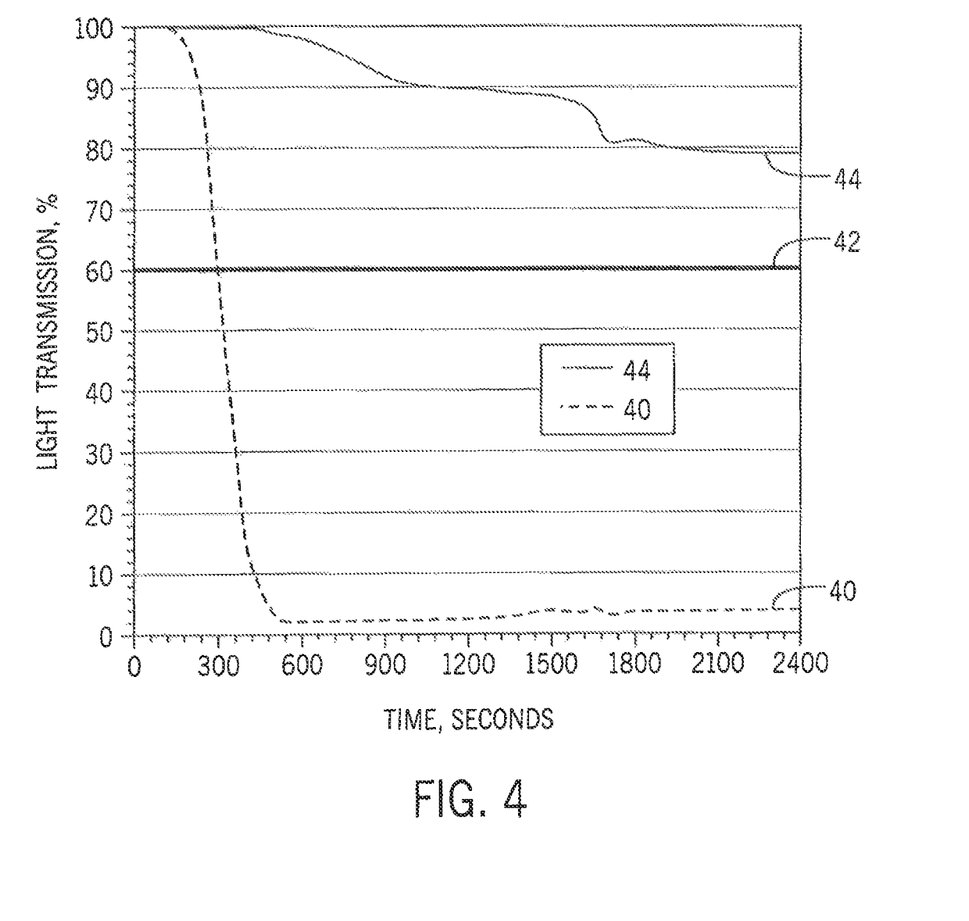
FIG. 4 is a graph illustrating percent light transmission as a function of time during a smoke density test for a conventional self-regulating heating cable and the LSZH self-regulating heating cable of FIG. 2.

For example, FIG. 4 illustrates a graph comparing a typical self-regulating heating cable 10 with a halogenated flame-retardant jacket made of polyolefin and the LSZH self-regulating heating cable 24 of FIG. 2 when exposed to a smoke density test in accordance with IEC 61034. Under this test, each cable 10, 24 is burned in a chamber under defined conditions and a white light beam is projected through the chamber from one side to an opposite side. A percentage of the beam's light transmission is measured at the opposite side of the chamber, indicating smoke buildup due to the cable burning and, more specifically, smoke density of the cable. To be classified low smoke under IEC 61034, the cable must exhibit a minimum light transmittance of 60%. In other words, when burned, the cable emits smoke that permits at least 60% light transmission through the smoke. As shown in FIG. 4, light transmittance of the cable 10 (line 40) drops below the 60% transmittance line 42 in just over 300 seconds. On the other hand, light transmittance of the LSZH self-regulating heating cable 24 (at line 44) does not drop below the 60% transmittance line 42 for the entire measured 2400 seconds. Instead, the light transmittance for the LSZH self-regulating heating cable 24 decreases gradually before leveling off well above the 60% threshold. And, though not shown in FIG. 4, the cable 26 of FIG. 3 may emit less smoke than the cable 24 of FIG. 2 because the barrier layer 38 helps to further lower smoke generation when the cable 26 is burned. Accordingly, the self-regulating heating cables 24, 26 of FIGS. 2 and 3 are low smoke cables per the IEC 61034 standard. Furthermore, by using LSZH jacket materials, the cables 24, 26 can meet the IEC 61034 standard even when the core 30 alone is not considered low smoke (i.e., when the core, by itself without any jacketing, could not pass the IEC 61034 smoke density test). Also, the cables 24, 26 can meet all the requirements of IEC 62395, which specifies requirements for electrical resistance trace heating systems.

The low smoke and zero halogen attributes of the self-regulating heating cable 24, 26 of some embodiments make it a suitable choice for enclosed locations, such as inside buildings, subways, and tunnels. In particular, because of the low smoke and zero halogen attributes, the self-regulating heating cable 24, 26 is a safer choice for such locations compared to typical cables that are not low smoke or zero halogen. Furthermore, in one embodiment, the LSZH materials used can permit the cable 24, 26 (such as the 10, 15, or 26 W/m cables) to be used in applications with temperatures ranging from −40 degrees Celsius to 65 degrees Celsius. In another embodiment, the LSZH materials used can permit the cable 24, 26 (such as the 31 W/m cable) to be used in applications with temperatures ranging from −40 degrees Celsius to 85 degrees Celsius.

Figure 5:
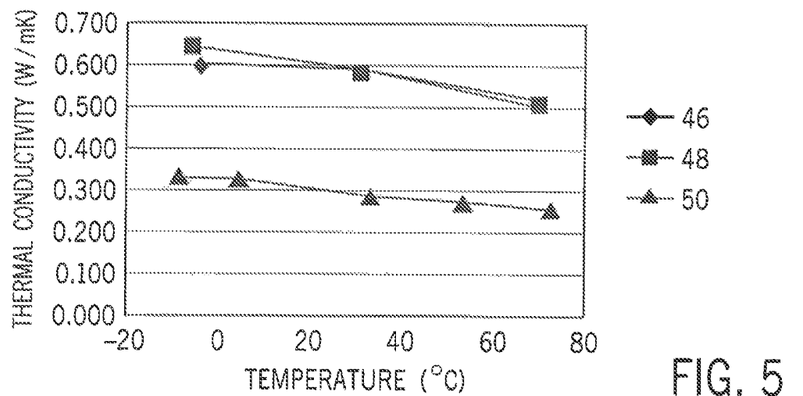
FIG. 5 is a graph illustrating thermal conductivity as a function of temperature for a first LSZH material, a second LSZH material, and a halogen-containing flame retarded material.

Additionally, compared to halogenated materials used in conventional jackets, the LSZH materials used in some embodiments of the invention exhibit greater thermal conductivity. For example, FIG. 5 illustrates cable thermal conductivity (in Watts per meter Kelvin) as a function of temperature (in degrees Celsius) for a first LSZH compound (line 46), a second LSZH compound having a different formulation (e.g., different components and percentages of components) than the first LSZH compound (line 48), and a conventional flame retarded halogen-containing jacket compound (line 50). As shown in FIG. 5, the thermal conductivity of the LSZH compounds (lines 46, 48) across all temperatures is about twice as great as the thermal conductivity of the conventional jacket compound (line 50).

Figure 6:
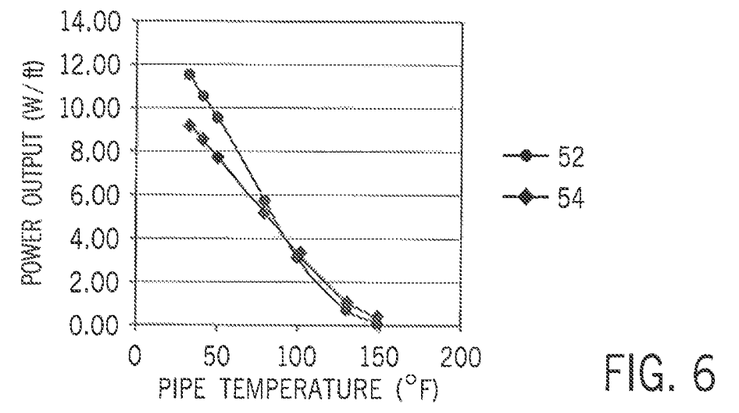
FIG. 6 is a graph illustrating power output as a function of temperature for a 26 watt-per-meter (W/m) LSZH self-regulating heating cable and a conventional 26 W/m self-regulating heating cable.
Figure 7:
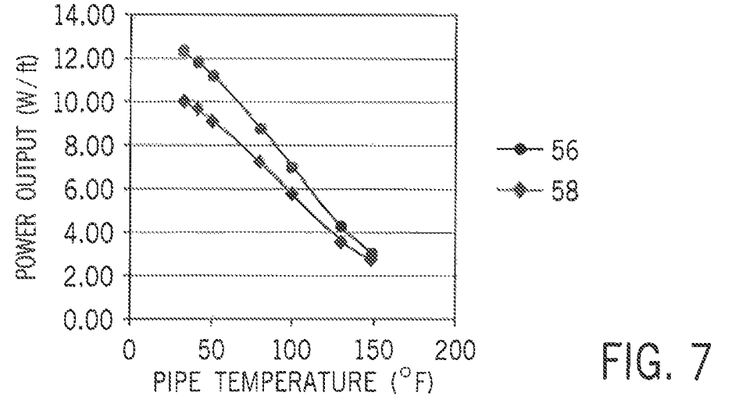
FIG. 7 is a graph illustrating power output as a function of temperature for a 31 W/m LSZH self-regulating heating cable and a conventional 31 W/m self-regulating heating cable.

The greater thermal conductivity of the LSZH cables 24, 26 of embodiments of the invention may in some embodiments permit greater power output than conventional cables. Additionally or alternatively, the LSZH cables 24, 26 may exhibit the same or similar overall power output as conventional cables, but may exhibit superior "indexed" power output (i.e., the change in power relative to the temperature, or change in temperature, of the cable). For example, FIG. 6 shows power output (in Watts per foot) as a function of temperature (in degrees Fahrenheit) for a 26 W/m LSZH-jacketed self-regulating heating cable for use with some embodiments (line 52) and a conventional 26 W/m self-regulating heating cable (line 54). As shown in FIG. 6, the 26 W/m LSZH cable exhibits greater power output than the conventional cable for temperatures up to about 100 degrees Fahrenheit (e.g., between about 40 degrees and about 100 degrees). Furthermore, the 26 W/m LSZH cable exhibits similar power output as the conventional cable at temperatures above about 100 degrees. Additionally, FIG. 7 shows power output (in Watts per foot) as a function of temperature (in degrees Fahrenheit) for a 31 W/m LSZH-jacketed self-regulated heating cable for use with some embodiments (line 56) and a conventional 31 W/m self-regulating heating cable (line 58). As shown in FIG. 7, the 31 W/m LSZH cable exhibits greater power output than the conventional cable for temperatures up to about 150 degrees Fahrenheit (e.g., between about 40 degrees and about 150 degrees).

Figure 8A:
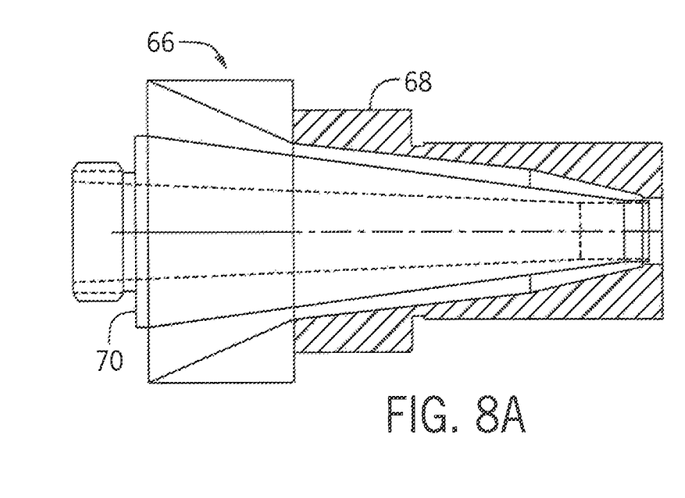
FIG. 8A is a top cross-sectional view of a tip and a die used in an extrusion process for an LSZH cable according to one embodiment of the invention.
Figure 8B:
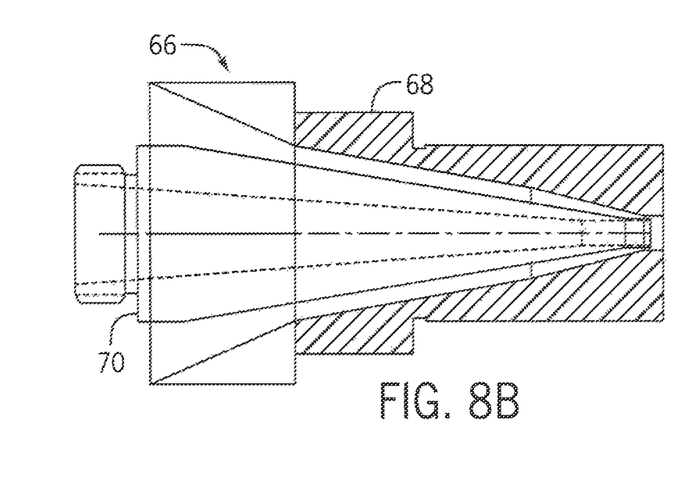
FIG. 8B is a side cross-sectional view of the tip and die of FIG. 8A
Figure 8C:
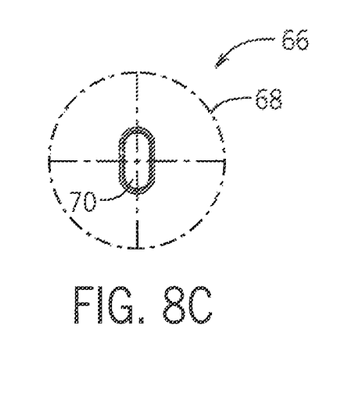
FIG. 8C is a rear view of the tip and die of FIG. 8A.

In some embodiments, the cables 24, 26 of FIGS. 2 and 3 can be made using an extrusion process. Furthermore, the cables 24, 26 can be made using an extruder with semi-pressure tooling. Additionally, in one embodiment, the extruder can include a low-shear, low-compression screw. This tooling can better accommodate highly filled LSZH materials compared to standard tooling. In particular, the LSZH material used for the final jacket 36 and/or the primary jacket 32 may be viscous and highly filled with mineral fillers. The material may have poor melt strength and low drawability at the melt that prevents using standard tube-on tooling. Also, pressure tooling may make the final jacket 36 stick to the braid 34, making stripping more difficult. As a result, to overcome these issues, final jacket extrusion and/or primary jacket extrusion can be completed using a semi-pressure tip and die. For example, FIGS. 8A-8C show top cross-sectional, side cross-sectional, and rear views, respectively, of a semi-pressure tip and die assembly 66 used for jacket extrusion in some embodiments. As shown in FIGS. 8A-8C, the assembly 66 can include a die 68 and a tip 70. The semi-pressure assembly 66, and the low-shear, low-compression screw (not shown) used with the assembly 66, permits processing LSZH materials at desired extrusion speeds.

Figure 9:
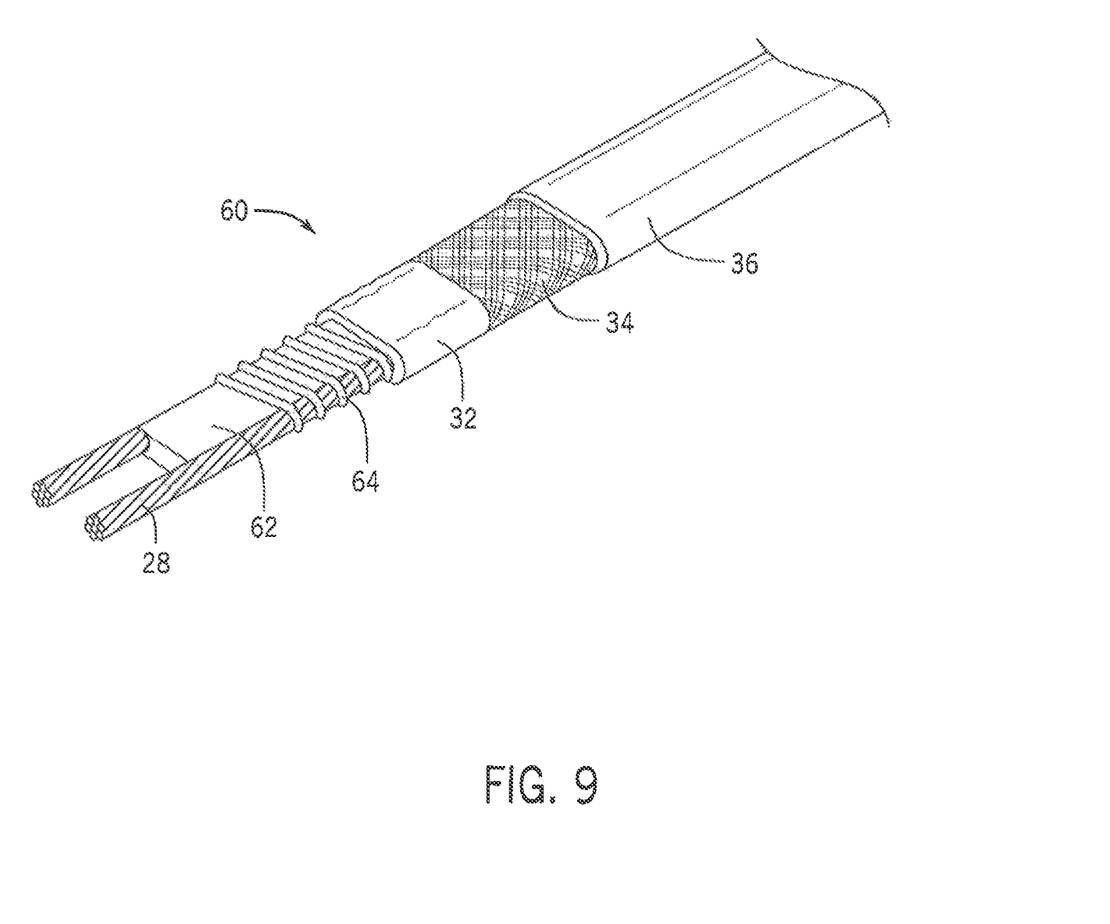
FIG. 9 is a perspective cutaway view of an LSZH self-regulating fiber-wrap heating cable according to one embodiment of the invention.

While the principles of this disclosure have been depicted as being utilized with particular structures, the LSZH self-regulating heating cable described herein should not be limited to such structures. For example, while the LSZH self-regulating heating cables 24, 26 described above are monolithic self-regulating heating cables (that is, having a solid conductive core 30), the principles of this disclosure may be utilized in conjunction with fiber-wrap self-regulating heating cables. In particular, as shown in FIG. 9, a fiber-wrap self-regulating heating cable 60 can include a spacer 62 between conductor wires 28, and a self-regulating polymeric fiber heating element 64 can be wrapped around the conductor wires 28 and the spacer 62 to provide electrical paths between the conductor wires 28. The wrapped conductor wires can then be covered by a primary jacket 32, an optional barrier or aluminum foil layer (not shown), a braid 34, and a final jacket 36 as described above.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

The invention claimed is:

1. A self-regulating heating cable comprising:
    a semi-conductive heating core;
    two conductive wires embedded within and separated by the semi-conductive heating core;
    a primary jacket surrounding the semi-conductive core and comprising a first low-smoke, zero halogen (LSZH) material;
    a braid surrounding the primary jacket and providing a ground path; and
    a final jacket surrounding the braid and comprising a second LSZH material;
    at least one of the first and second LSZH materials comprising polyolefin flame-retarded with inorganic hydrated mineral fillers.

2. The self-regulating heating cable of claim 1, wherein the inorganic hydrated mineral fillers include at least one of aluminum trihydrate and magnesium hydroxide.

3. The self-regulating heating cable of claim 1, wherein the first LSZH material is cross-linked and the second LSZH material is not cross-linked.

4. The self-regulating heating cable of claim 1, wherein the first and second LSZH materials are configured to have respective thermal conductivities that enable the self-regulating heating cable to produce a power output of 10 Watts per meter (W/m), 15 W/m, 26 W/m, or 31 W/m when at 5 deg C.

5. The self-regulating heating cable of claim 1, wherein the first and second LSZH materials are sufficiently flame-retardant that at least 60% of light incident upon smoke emitted by burning the self-regulating heating cable of a smoke density defined in International Electrotechnical Commission (IEC) standard 61034 is transmitted through the smoke.

6. The self-regulating heating cable of claim 1, further comprising a barrier layer separating the primary jacket and the braid and protecting the primary jacket, the core, and the wires from ingress of water and fire.

7. The self-regulating heating cable of claim 6, wherein the barrier layer comprises aluminum foil.

8. The self-regulating heating cable of claim 1, wherein the semi-conductive heating core comprises a solid material comprising one or more polymers mixed with conductive carbon.

9. The self-regulating heating cable of claim 1, wherein the conductive wires are made of nickel-coated copper.

10. The self-regulating heating cable of claim 1, wherein the primary jacket is about 0.033 inches thick.

11. The self-regulating heating cable of claim 1, wherein the braid comprises a tinned-copper braid.

12. The self-regulating heating cable of claim 1, wherein the final jacket is about 0.021 inches thick.

13. The self-regulating heating cable of claim 1, wherein one of the semi-conductive heating core, the primary jacket, and the final jacket are cross-linked.

14. A self-regulating heating cable comprising:
    a heating core comprising a positive temperature coefficient material;
    two conductive wires embedded within and separated by the heating core;
    a primary jacket surrounding the heating core and comprising a first low-smoke, zero halogen (LSZH) material;
    a braid surrounding the primary jacket and providing a ground path; and
    a final jacket surrounding the braid and comprising a second LSZH material;
    the first and second LSZH materials being selected so that:
        when burned, the self-regulating heating cable emits smoke that permits at least 60% of light transmittance; and
        the self-regulating heating cable is rated for a power output, measured at about 5 degrees Celsius, of about 10 Watts per meter (W/m), about 15 W/m, about 26 W/m, or about 31 W/m.

15. The self-regulating heating cable of claim 14, wherein one or both of the first and second LSZH materials comprises polyolefin flame-retarded with inorganic hydrated mineral fillers.

16. The self-regulating heating cable of claim 15, wherein the inorganic hydrated mineral fillers include at least one of aluminum trihydrate and magnesium hydroxide.

17. The self-regulating heating cable of claim 14, wherein at least one of the heating core, the primary jacket, and the final jacket are cross-linked.

18. The self-regulating heating cable of claim 17, wherein the primary jacket is cross-linked and the final jacket is not cross-linked.

19. The self-regulating heating cable of claim 14, further comprising a barrier layer separating the primary jacket and the braid and protecting the primary jacket, the core, and the wires from ingress of water and fire.

20. The self-regulating heating cable of claim 19, wherein the barrier layer comprises aluminum foil.

* * * * *